US007640459B2

(12) United States Patent
Ivanov et al.

(10) Patent No.: US 7,640,459 B2
(45) Date of Patent: Dec. 29, 2009

(54) PERFORMING COMPUTER APPLICATION TRACE WITH OTHER OPERATIONS

(75) Inventors: Ventsislav Ivanov, Sofia (BG); Georgi N. Mihailov, Pleven (BG)

(73) Assignee: SAP AG, Walldorf (DE)

( * ) Notice: Subject to any disclaimer, the term of this patent is extended or adjusted under 35 U.S.C. 154(b) by 325 days.

(21) Appl. No.: 11/540,851

(22) Filed: Sep. 30, 2006

(65) Prior Publication Data

US 2008/0155349 A1    Jun. 26, 2008

(51) Int. Cl.
*G06F 11/00* (2006.01)
(52) U.S. Cl. ...................................................... 714/45
(58) Field of Classification Search ..................... 714/45
See application file for complete search history.

(56) References Cited

U.S. PATENT DOCUMENTS 5,124,909 A * 6/1992 Blakely et al. .............. 709/203
6,978,396 B2 * 12/2005 Ruuth et al. .................. 714/6
2006/0242319 A1 * 10/2006 Sang et al. .................. 709/240

OTHER PUBLICATIONS

Weber, Steven; Hariharan, Rema. A New Synthetic Web Server Trace Generation Methodology. 2003. IEEE.*

* cited by examiner

*Primary Examiner*—Nadeem Iqbal
(74) *Attorney, Agent, or Firm*—Blakely Sokoloff Taylor & Zafman

(57) ABSTRACT

A method and apparatus for performing a computer application trace without interference with other operations. An embodiment of a method includes establishing a server session for a computer application, where the computer application is operating on a computer system. A trace session is established on the computer system, the trace session being connected with the server session. A performance trace of the computer application under the trace session is enabled, and a set of trace data for the performance trace is collected, where the set of trace data to correlated with the server session.

16 Claims, 9 Drawing Sheets

PERFORMING COMPUTER APPLICATION TRACE WITH OTHER OPERATIONS

TECHNICAL FIELD

Embodiments of the invention generally relate to the field of computer systems and, more particularly, to a method and apparatus for perform a computer application trace without interference with other operations.

BACKGROUND

In the operation of computers, it may be necessary to perform a trace of a computer application when issues arise in operation, such as when the application is not performing correctly or excessive memory is being consumed.

In an example, a trace may be required in a large, complex computer landscape that includes numerous different systems and different types of systems. However, such large systems are commonly productive systems that cannot be easily isolated or shut down. In such a complex environment, it may be expected there may be many different operations required by multiple users, including potentially multiple traces. Because of the distribution of data and resources, the various operations will likely share the same data while they overlap in time.

While it may be expected that overlapping operations will affect each other in that each operation may modify the common data, this is problematic for trace operations. If the traces interfere with each other, then the traces will not provide useful results. In certain circumstances, it could be necessary to limit traces to avoid interference.

SUMMARY OF THE INVENTION

A method and apparatus for performing a computer application trace with other operations.

In one aspect of the invention, a method includes establishing a server session for a computer application, the computer application operating on a computer system. A trace session is established on the computer system, with the trace session being connected with the server session. A performance trace of the computer application under the trace session is enabled, and a set of trace data for the performance trace is collected, where the set of trace data to correlated with the server session.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
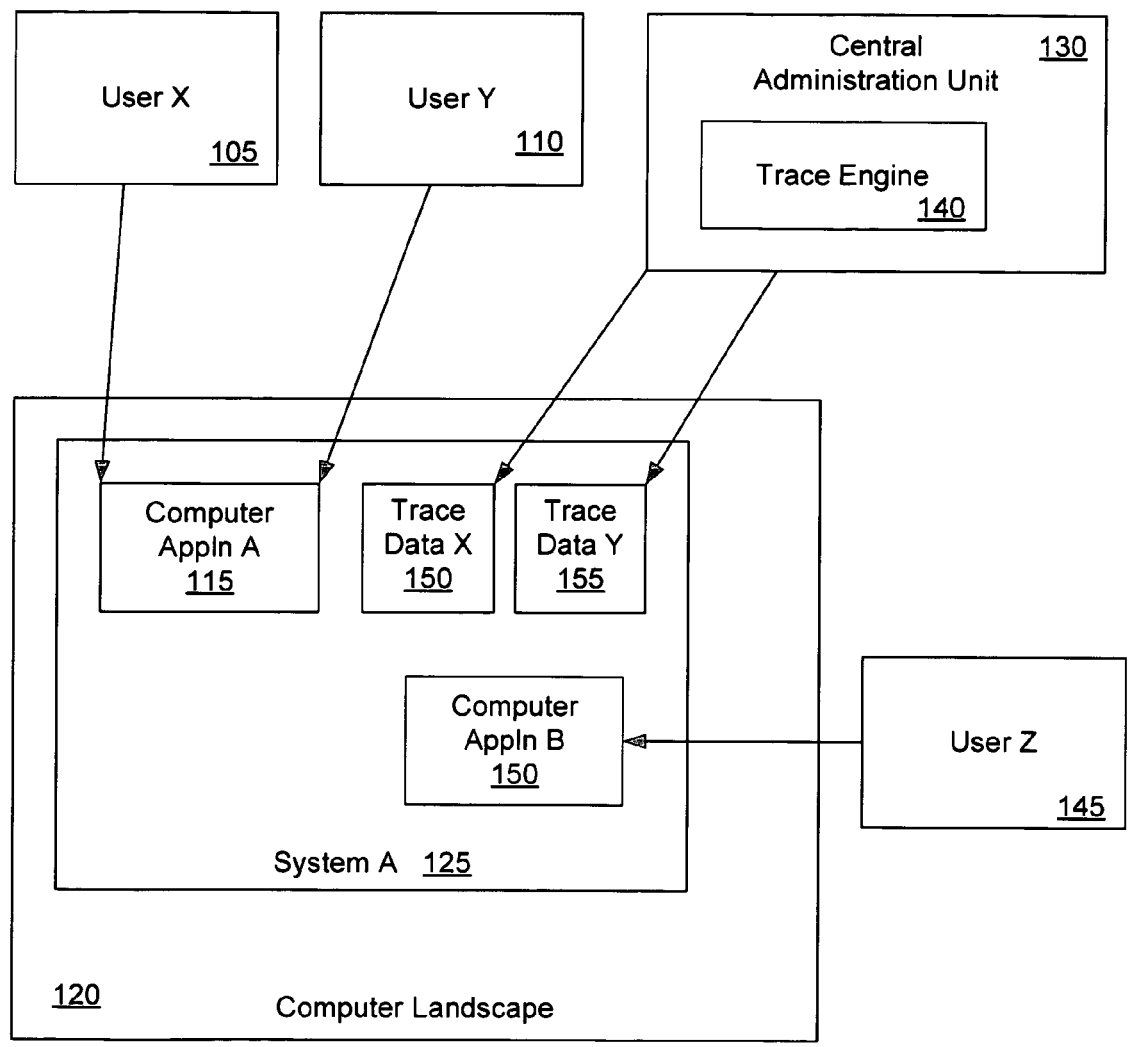
FIG. 1 is an illustration of an embodiment of the performance of trace operations with other operations.

Embodiments of the invention are generally directed to tracing activities of applications running on multiple nodes.

As used herein, a "trace" or "performance trace" is a process for obtaining data regarding the operation of a computer application. A "trace" includes a method to check the functioning of a computer program by obtaining the values of the variables used by the application in operation.

As used herein, an "end to end trace" is a trace that involves an application operating in multiple systems.

As used herein, an "administration system" means a system for administration of a server. The duties of an administrator include the operation of traces of computer applications. An administration system includes the NetWeaver Administrator (NWA) of SAP AG, which is a web-based tool that provides an interface for the SAP NetWeaver system.

As used herein, a "cluster of servers" is a group of independent servers running operating collectively as a single system. In general, a cluster of servers appears to a client as a single server instance.

As used herein, "managed bean" or "MBean" is a Java program object to manage a resource, such as an application, a service, a component, or a device.

As used herein, a "URL" or "uniform resource locator" is an HTTP (Hypertext Transfer Protocol) address that specifies a resource on the Internet. A URL for an Internet resource instructs a browser program regarding where to the Internet resource.

In an embodiment of the invention, a trace session is established in a system, with a trace being performed in the trace session without interfering with other operations. In an embodiment, the trace session is connected with a server session, with a lifespan that is limited by the server session. In an embodiment, the trace session allows the collection of trace data from a user's activities while one or more other users work on the same system for other activities.

In an embodiment of the invention, a user's activities are mapped to a unique HTTP session that is provided from HTTP service. In case of errors, slow performance, or other application issues, the use of a parameter in the address for an application allows a user to run traces over the user's session and collect data that can be analyzed. In an embodiment, a special parameter is attached to the URL for the application to establish a trace session. The trace session is connected to an HTTP session, and the lifespan of the trace session is the same or shorted than the HTTP session.

In an embodiment, a user is not limited to a single trace session for an HTTP. During an HTTP session, it is possible for a user to have multiple trace sessions. In addition, if other users are running activities at the same time as the operation of a trace in the trace session, the trace data is collected is only for the single trace session does not affect the work of the other users. In an embodiment of the invention, a system provides information about which requests belong to a particular "user click" for a trace session, and separate such data from other activities.

In an embodiment of the invention, a system manipulates a trace session for a computer application using address parameters. In a particular example, the system generates parameters for the trace of an application, the parameters to be appended to a URL (uniform resource location) for the application. A trace session is initiated using the URL and the generated parameters. In an embodiment of the invention, the system utilizes the parameters to separate a trace from other operations, thereby allowing multiple users to engage in operations at the same time. In an embodiment, the parameters may designate the type of performance trace to be run and may identify the system or systems to be subject to the trace. In an embodiment, a call to the URL of a computer application using one or more generated parameters will separate a trace session from other calls to the computer application.

In computer operations, an application may not operate properly and may require tracing. However, in a busy, complex it generally is not possible to engage in a trace operation without regard to the activities of other users on the system. On productive systems, as opposed to test systems, a slowdown of response or crashes of application resulting from trace operation can lead to significant problems for the overall operation of the system.

Because of this, the operation of traces for a system requires care to minimize the effect on productive operations. In an embodiment of the invention, special parameters in a URL may be utilized by users to commence a trace session for current user work without interference to other users.

In an embodiment of the invention, the choice of special parameters in a URL can provide for initiation of a trace session for a current user activity. In an embodiment, different kinds of traces can be started depending on the generated parameters. In an embodiment, starting a trace session for one user on a system by calling the URL for an application and the generated parameters for the trace session will not significantly affect the work of the users. In addition, an embodiment of the invention makes it possible to run trace sessions for different users simultaneously in whole or in part.

In an embodiment of the invention, in order to initiate a trace session, a call is made to the URL for the computer application, which includes parameters that have been generated to designate the trace session. The use of the parameter allows the collection of data without interfering with any other user session. If the parameters are not used, then the separate sessions can affect the operation of each other, but multiple initiated traces sessions utilizing generated parameters to distinguish each session do not affect each other.

In general, if a URL for a particular application is called without any parameters, then multiple users can engage operations for the same application at the same time. However, as a result the operations in the simultaneous sessions can affect each other. For traces it is important that operations remain separate. The effects of multiple users may make it difficult or impossible to determine the how the operations occurred, and thus the trace will not be effective in identifying an area of trouble in an application.

In an embodiment of the invention, data for a performance trace is correlated to connect the data to the trace. In an embodiment, an element which may be referred to as a "passport" is sent with communications to identify and distinguish the end to end trace. In an embodiment, the passport includes a unique correlation ID that is used to correlate data for any particular performance trace. In an embodiment, the passport is a DSR (distributed statistics record) passport, where distributed statistics records are records to enable monitoring of the performance of a system. The DSR passport may be created on the first system on which tracing begins, and distributed with the trace such that the correlation ID is passed to each system. In an embodiment, the distribution of the passport may be utilized in multiple different types of systems, including, for example, J2EE systems and the SAP ABAP system. In an embodiment of the invention, an end to end trace of a computer application is implemented by correlating the traces in each system to allow formation of an overall trace result, with a passport being sent together with every communication for the end to end trace in the format that is appropriate for each traced system.

In an embodiment of the invention, the process of correlation varies with the system and tracing process. In an embodiment of the invention, correlation objects may be used to identify the path of a user activity and then to display which systems are involved. In JARM (Java Application Response Time Measurement) and SQL traces an end to end trace may operate with the assistance of a trace correlator object that is used to analyze trace records that originate from different software components.

A correlator defines a semantic group, which may be used to assist in understanding how traces relate to each other. In an example, a user activity for an application may trigger several requests that are processed by multiple different components. In an embodiment, a system will run an application on multiple systems, collect traces from each of the systems, and merge and analyze the traces. In this process, abstract correlated objects are introduced to allow end-to-end analysis of the user objects, which may be processed by many components running on various different host systems. The correlation objects are used to combine trace data from different sources, and may be serialized over a network and transferred via the appropriate metadata for each communication protocol. The correlators for each trace may include, for example, a passport identification, a user name (to attach the trace to a particular user), and a transaction name (to identify a particular transaction, such as particular run of an application).

In an embodiment of the invention, a trace is also stopped by using the URL for the application together with the parameters generated for the trace session. In an embodiment, the use of the parameters will identify the appropriate trace to be stopped, without interference with other traces. In one embodiment, the trace is ended by a call to stop the trace. In another embodiment, the trace is ended by ending the trace session.

In an embodiment of the invention, a system automatically provides parameters to establish traces. For example, a trace manager that is responsible for managing traces may generate one or more parameters to establish a trace session. For each user, an HTTP session may be enabled together with one or more trace sessions that are associated with the HTTP session via a DSR (distributed statistics record) passport. In this manner, a trace session for a first user is separated from a trace session for a second user. Any data collected for the first trace session will relate only to the first trace session, and any data collected for the second trace session will relate only to the second trace session. Thus, in an embodiment of the invention a trace system automatically provides a mechanism for enabling separate traces of an application by different users, with each trace having no effect on the other.

In a particular embodiment of the invention, one or more URL parameters may be used to call a trace in an end to end trace system. In an embodiment of the invention, an end to end trace may be used to assist in finding problems in distributed systems. In an embodiment, the URL parameters may designate which systems will be involved in a trace. The systems involved in the operation of an application may be of any kind. In one example, the distributed systems may include a first system and a second system. The first system may be a Java system, such as a J2EE (Java 2 Platform, Enterprise Edition) environment (as described in the Java 2 Platform Enterprise Edition, v. 1.4 API Specification and related specifications). The second system may be, for example, a proprietary system such as the ABAP (Advanced Business Application Programming) system of SAP AG. However, embodiments of the invention are not limited to any particular number or type of systems, and may include the monitoring of other types of computer environments.

In a particular embodiment of the invention, a vendor may provide a customer with a solution that operates on separate systems, with such systems being in communication with each other. For example, a user call may go to a Java stack of a web application server on one system, and a call to ABAP stack of another system may then be made. If the application does not operate properly, it may be difficult to determine on which system the problem has occurred, or what exactly the problem is. In an embodiment of the invention, an end to end trace starts different traces on all of the systems in the cluster of servers in order to provide data from all of the involved systems that may relate to the problem. In an embodiment of the invention, correlation objects are used to identify the path of a user activity and then to display which systems are involved. In an embodiment of the invention, an end to end trace may use common trace format for storing trace data to assist in troubleshooting. (The common format may be referred to as common performance trace, or CPT.) The resulting trace data is stored in a database of a central system, which may be in the common trace format, where the data can be analyzed in multiple different ways.

In an embodiment of the invention, an end to end trace of a computer application is implemented by correlating the traces in each system to allow formation of an overall trace result. In an embodiment, an end to end trace operates with the assistance of a trace correlator object, which is used to analyze trace records that originate from different software components. A correlator defines a semantic group, which may be used to assist in understanding how traces relate to each other. In an example, a user activity for an application may trigger several requests that are processed by multiple different components. In an embodiment, a system will run an application on multiple systems, collect traces from each of the systems, and merge and analyze the traces. In this process, abstract correlated objects are introduced to allow end-to-end analysis of the user objects, which may be processed by many components running on various different host systems. The correlation objects are use to combine trace data from different sources, and may be serialized over a network and transferred via the appropriate metadata for each communication protocol. The correlators for each trace may include, for example, a passport identification (as described further below), a user name (to attach the trace to a particular user), and a transaction name (to identify a particular transaction, such as particular run of an application).

In an embodiment of the invention, a performance trace system includes an administration system, the administration system having duties that include the implementation and management of end to end traces. The administration system includes modules for the operation of end to end traces, includes modules for the import of trace data from each type of system. The administration system further includes a JMX (Java management extensions) provider to provide JMX interfaces. JMX is utilized to instrument, manage, and monitor server components, including services, interfaces, and libraries, and computer applications.

In an embodiment of the invention, a data element, which may be referred to as a "passport", is sent with communications to identify and distinguish the end to end trace. In an embodiment, a common identifier is needed for traces to connect the traces to a particular trace session. In an embodiment, the passport is a DSR passport, where distributed statistics records are records to enable monitoring of the performance of a system. The DSR passport may be created on the first system on which tracing begins, and distributed with the trace. In an embodiment, the distributed reports may be utilized in multiple different types of systems, including, for example, J2EE systems and the SAP ABAP system. In the embodiment, the passport is sent together with every communication for the end to end trace in the format of each traced system. For example, in ABAP the passport is a specific correlator object existing in an ABAP word and which corresponds to a particular a new LUW (logical unit of work). In the Java stack the passport is maintained by the DSR service and corresponds to a security session. The passport may include a GUID, which is a unique identifier or key for the trace session. If other types of systems are involved in a performance trace, the passport would be supported by as required in the system.

In a possible example, a user may run a process on multiple systems and determine that an error or other issue has arisen with regard to such process. The user then may select the systems to be traced from an administration system and start a new trace activity. The user may further select the types of traces to be run. The user then runs any relevant test cases, and each monitored system traces all actions within the trace request. The user may then stop the trace activity. The system then collects and merges the trace data from all of the selected systems to allow for analysis of the collected data. The resulting combined result then may be viewed by the user.

In an embodiment of the invention, a system may optionally include an HTTP proxy for use in collecting client statistics. In an embodiment, an HTTP proxy listens to requests from a browser to the system in order to measure time that is lost in network communication. If an HTTP proxy is used, client data is uploaded to the administration system. In an example, an HTTP proxy application may be installed on a system, such as specifically in a computer on which a browser is opened for the operation of a trace. The proxy may be used to measure client rendering and network traffic after a response from a server is returned. In this example, resulting end data then may include HTTP requests with duration time values for rendering time, network time, and server time.

In an embodiment of the invention, a monitored system includes such import modules as are needed to generate and transfer trace data for the relevant systems. For example, a J2EE monitored server includes an MBean (managed Java bean) server, and utilizes an MBean to provide trace models. An MBean is a Java object that represents a manageable resource, such as an application, a service, a component, or a device. In an embodiment of the invention, an ABAP monitored server includes a CCMS (Computer Center Management) agent and an administration system includes a CCMS system. CCMS refers to the ABAP based monitoring infrastructure of SAP AG. Other types of servers may include other types of import modules needed to obtain and transfer data collected in trace operations.

In an embodiment of the invention, an end to end trace result is generated from the correlated traces of multiple different systems. The trace result may be represented as a display for a user. The display of trace results may include display that illustrates how the time was used in the application operation and how it was distributed among different application elements.

In an embodiment of the invention, a user interface may be provided for a user to request traces and to obtain the results for analysis. In an embodiment, the user interface may utilize a web-based system, and may operate in conjunction with a web-based administration unit. This may be implemented as, for example, a Web Dynpro application in a NetWeaver administrator plug-in. However, embodiments of the invention are not limited to any particular interface process for a user.

FIG. 1 is an illustration of an embodiment of the performance of trace operations with other operations. In this illustration, a first user, user X 105, may utilize a computer application A 115, which operations may include system A 125 in a computer landscape 120. In an embodiment, an HTTP session is established for user X 105. However, the computer application may not operate correctly, and thus the user may need to determine the source of the problem. In an embodiment, a central administration unit 130 may include a trace engine 140 that may be used to perform a performance trace on the computer application 115. In an embodiment, the performance trace results in a certain set of trace data, designated in FIG. 1 as trace data X 150. In other embodiments of the invention, the trace data may be combined with trace data from other systems if the computer application runs 115 on multiple systems.

However, a second user, user Y 110, may also require the operation of the computer application 115, and the operations may overlap in time or be simultaneous. The operations may include the performance of another trace, thus resulting in a second set of trace data, trace data Y 155. In an embodiment of the invention, the data collected for the first trace is separated from the data collected from the second trace by correlation of the trace data. In an embodiment, the trace data X 150 only applies to the trace performed for the session of user X 105, and the trace data Y 155 only applies to the trace performed for user Y 110.

The method of correlation of trace data may vary in different embodiments. In one example, a system may utilize a correlation object that limits trace operations to operations under a trace. In another example, a system may utilize a correlator ID to separate the trace data from other data. In an embodiment of the invention, the user activity for user X 105 is mapped to a unique HTTP trace session, the trace session being the user's session enabled for trace operations. In an embodiment, a special parameter is used in calling the URL for the computer application 115 to allow performing the trace only over user X's session. In an embodiment, the parameter may include a correlation ID. In an embodiment, a trace session is connected to the user's session, the trace session being the user's session while it is enabled for a trace. Therefore, the trace session has a lifespan that is the same or shorter than the user's session. In an embodiment, a user may have multiple trace sessions over the period of the user's session. If the trace session for user X 105 operates overlaps in time with activities for the session of user Y 110, the trace data X 150 relates only to the trace for user X 105, and trace data Y 155 only applies to the trace for user Y 110.

Figure 2:
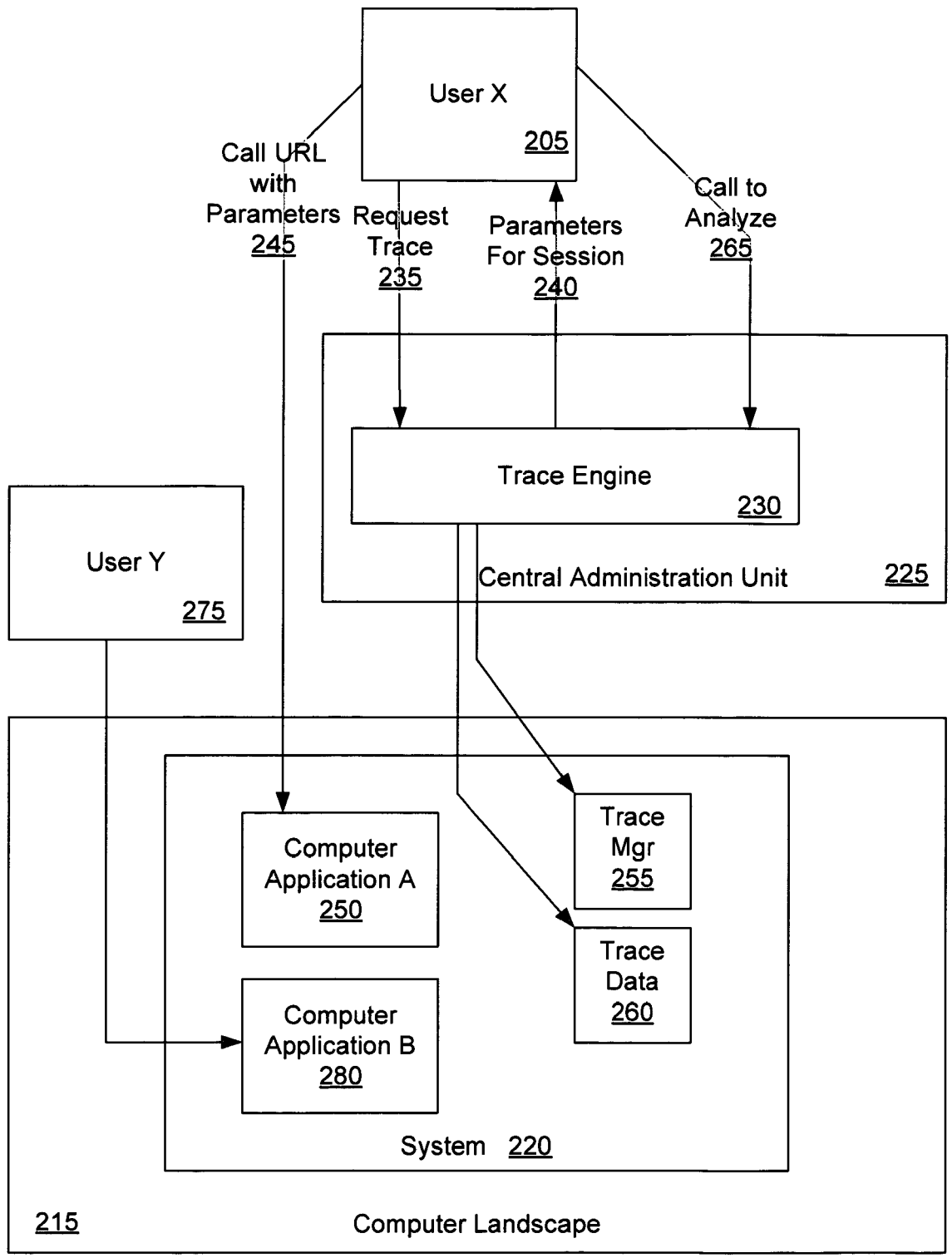
FIG. 2 is an illustration of an embodiment of a use of an application address to enable a trace session.

FIG. 2 is an illustration of an embodiment of a use of an application address to enable a trace session. In this illustration, user X 205 may enable a computer application A 250. The user X 205 may be an individual in certain circumstances, or may be an automated unit or system. In an embodiment, the computer application A 250 may operate in a computer landscape 215 that may include a system 220. In an embodiment, an HTTP session is established for user X 205. If the computer application does not operate properly for any reason, it may be necessary to conduct a performance trace of the computer application.

In an embodiment of the invention, a central administration unit 225 includes a trace engine 230 that may be used to provide a trace of an application running on system 220. In an embodiment of the invention, if the user 205 requests a trace 235, the trace engine 230 generates parameters for a trace session 240, where a trace session is an HTTP session that has been designated for a trace. In addition, the trace engine may generate a trace manager 255 to collect trace data 260. In an embodiment of the invention, the user X 205 may initiate the trace session by making a call to the URL for the application 245, with the call including the parameters generated by the trace engine 230.

Upon initiating the trace, trace data will be generated for the system 220, shown here as trace data 260. In an embodiment, the parameters used to call the application may determine what types of trace data will be collected. In an embodiment of the invention, the trace data 260 may utilize a common trace format (CPT—common performance trace), or may be converted to such a common trace format. The user then may make a call to analyze the collected trace data 260.

In an embodiment of the invention, system 220 is a productive system, and another user Y 275 is also utilizing the system by running computer application B 280. In an embodiment of the invention, the trace data 260 is separated from the operation of computer application B by a correlation process. In an embodiment, the establishment of the trace session for user X 205 enables the generation of trace data only for the trace session, and thus the operation of computer application B for user Y 275 will not impact the collected trace data because no trace data will be collected for such operation. In another embodiment, the enablement of tracing in system 220 will enable collection for all operations of such system, including the operations of computer application B 280. In this embodiment, a correlator will separate the collected data such that only the relevant trace will be seen with regard to the performance trace. For example, a trace ID may be stored with the relevant trace data, the trace ID having been generated in the parameters for the session 240 and having been received in the call of the computer application URL and parameters.

Figure 3:
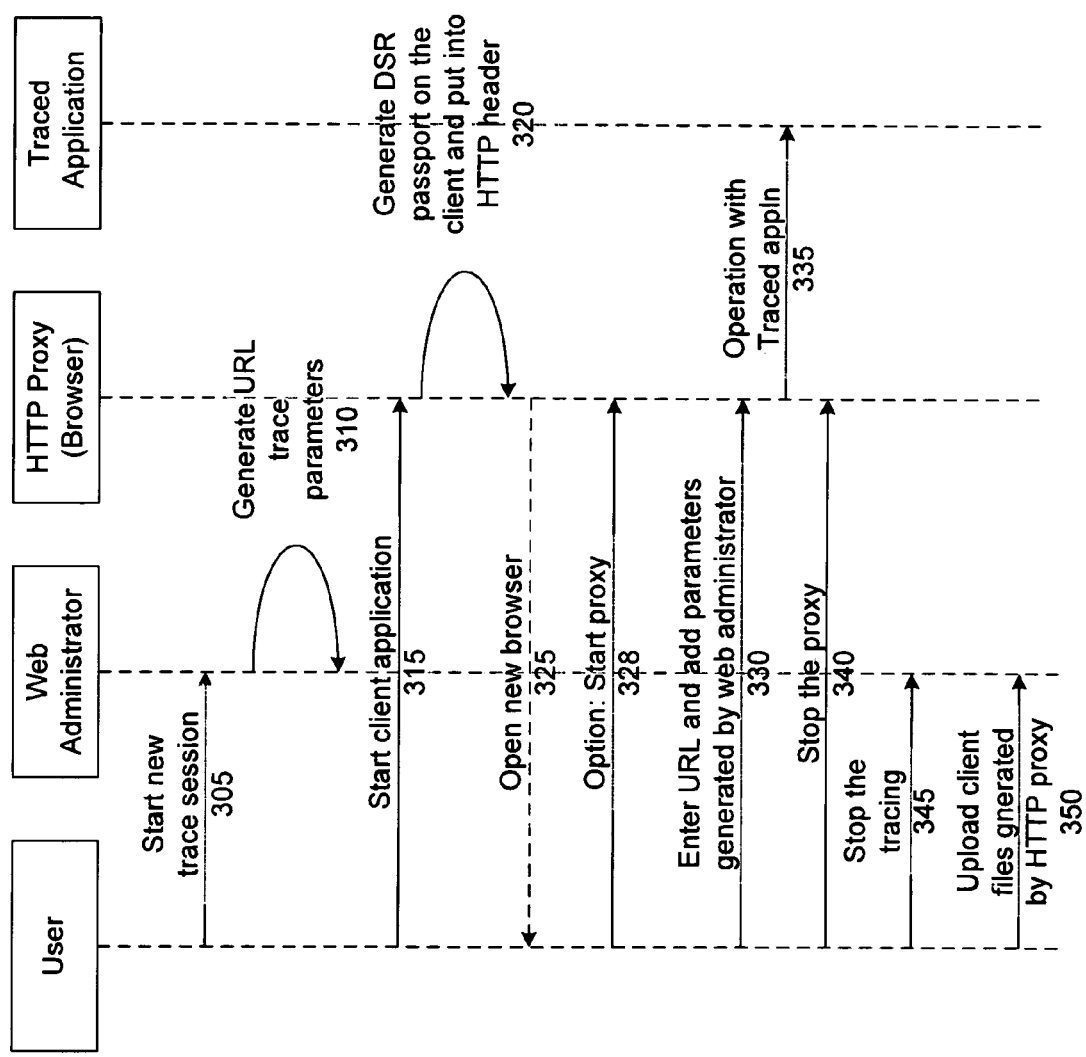
FIG. 3 illustrates an embodiment of a process for enabling a trace of an application.

FIG. 3 illustrates an embodiment of a process for enabling a trace of an application. In this illustration, a user who is operating an HTTP session starts a new trace session 305. In response, a web administrator generates URL trace parameters for the trace session 310. The utilization of the URL parameters enables the trace session to be implemented together with other operations. The user may then start the client application 315. In response, an HTTP proxy may then generate a DSR passport on the client and put the passport into the HTTP header 320. A new browser may then be opened for the user 325. A proxy may optionally be opened. The user may enter the URL and add the parameters generated by the web administrator 330. This may be followed by an operation with the traced application 335.

At the conclusion of the trace operation, the HTTP proxy may be stopped 340 and the tracing process is stopped 345. The client files generated by the HTTP proxy then are uploaded to the web administrator for analysis of the trace results 350.

Figure 4:
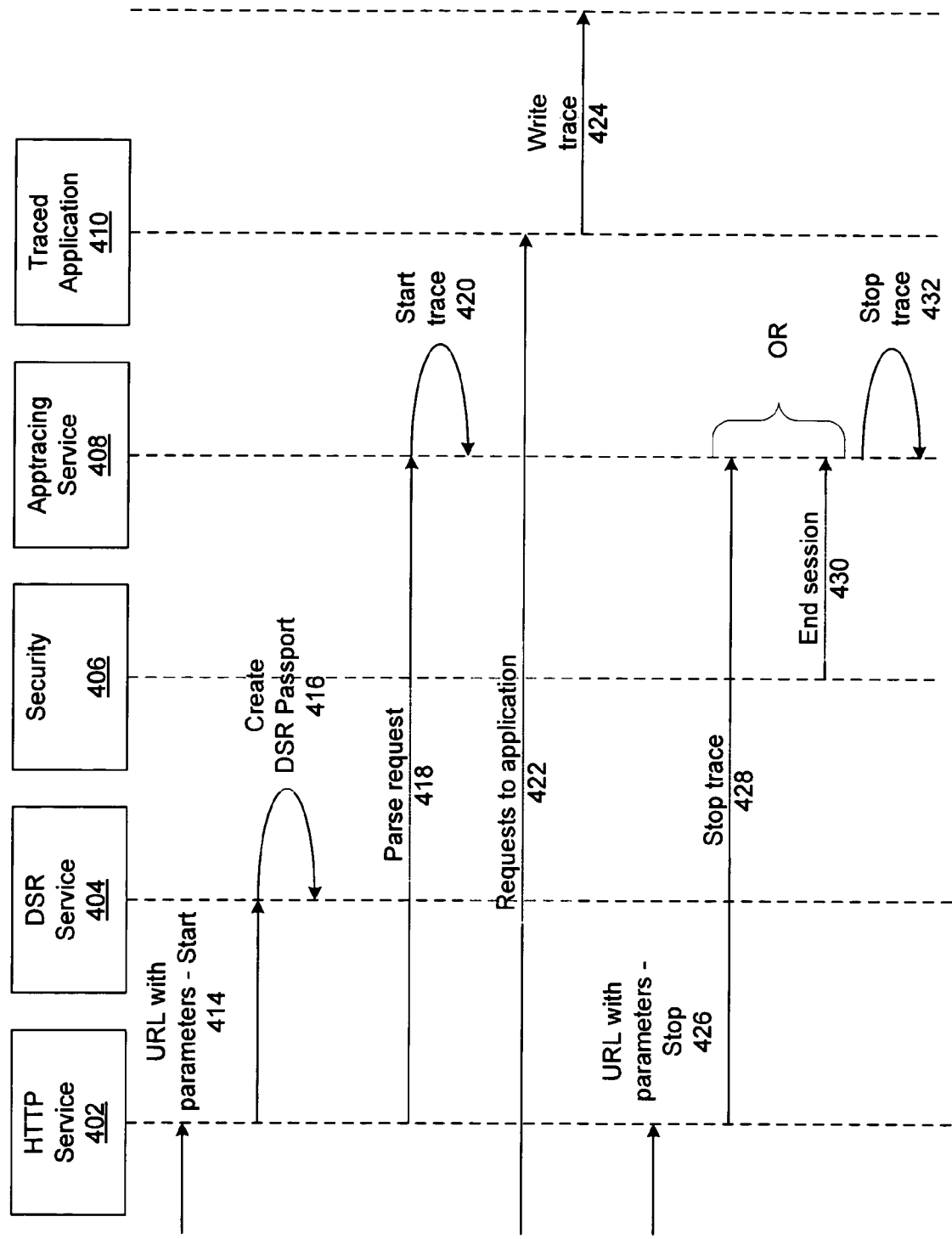
FIG. 4 is an illustration of an embodiment of a process for starting and ending a trace.

FIG. 4 is an illustration of an embodiment of a process for starting and ending a trace. In this illustration, the initiation of the trace is shown via operations of an HTTP service 402, a DSR service 404, a security element 406, an application tracing service 408, the traced application 410, and a CPT (common trace protocol) system 412. In an embodiment of the invention, an HTTP service receives a URL with parameters for a particular trace session. The URL and parameters may be received from a user who is establishing a trace session to perform a trace on a computer application. The parameters may, for example, be the parameters generated in the illustration provided by FIG. 3. In an embodiment of the invention, the URL and parameters may initiate an end to end trace, which may utilized a correlation object to correlate different trace elements from different systems. For example, a DSR service may generate a DSR passport 416. For a particular user, an HTTP session may be enabled together with one or more trace sessions that are associated with the HTTP session via the DSR passport.

In this illustration, the request for a trace is parsed 418 by the application tracing service 408, and the trace is started 420. In the process of the trace, any requests are made 422 to the traced application 410. The traced application then provides the trace data to be written 424 to storage, which in this case is the CPT system 412.

When the trace is completed, the requisite URL with parameters is received for a stop 426 at the HTTP service 402. The HTTP service may make a call to the application tracing service 408 to stop the trace 428. In another embodiment, the security element may make a call to the application tracing service 408 to end the trace session 430. The application tracing service will stop the trace 432, which may allow the requesting user to obtain the relevant trace data and examine the outcome.

Figure 5:
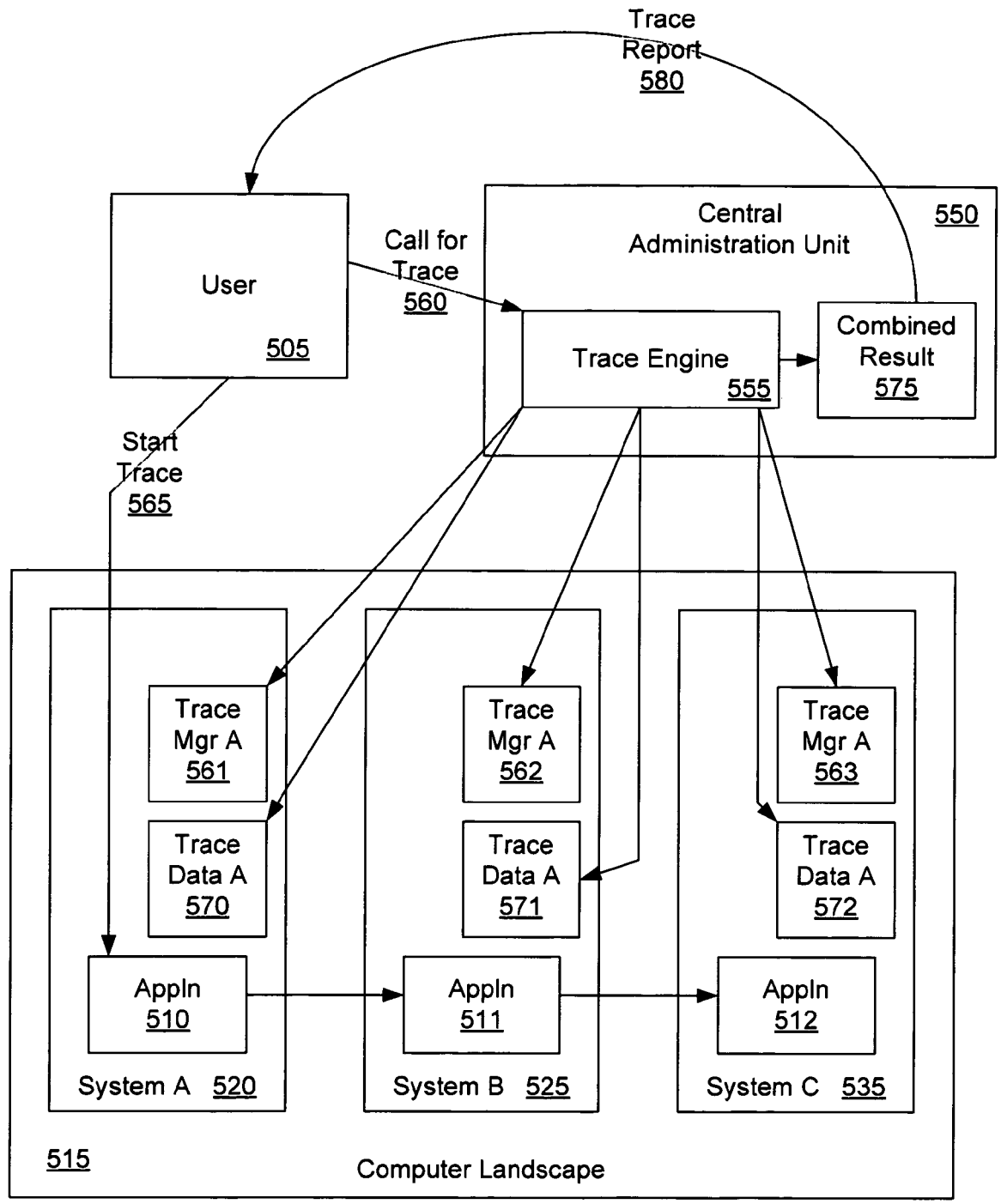
FIG. 5 is an illustration of an embodiment of an architecture of a trace system.

FIG. 5 is an illustration of an embodiment of an architecture of a trace system. In this illustration, user 505 may operate a computer application in a computer landscape. The user may be an individual in certain circumstances, or may be an automated unit or system. In an embodiment, the user 505 may call a computer application may in a computer landscape 515 that may include multiple different systems of different types. For example, in the computer landscape 515, the user may call a computer application A 510 in a system A 520. In operation, computer application A may then call computer application B 511 in system B 525, which, for example, may call computer application C 512 in system C 535. Thus, in this example, the operation of a computer application operates in systems A, B, and C. If the computer application does not operate properly for any reason, it may be necessary to conducts traces of the computer application as applied in each of the affected systems.

In an embodiment of the invention, a central administrator unit 550 includes a trace engine 555 that may be used to provide a trace of each of the affected systems. If the user 505 calls for a trace 560 in each of the systems, the trace engine 555 takes action to initiate a trace on each of the affected systems. In an embodiment, the trace engine 555 opens a trace manager in each system to collect data, as shown in FIG. 1 as trace manager A 561 in system A 520, trace manager B 562 in system B 525, and trace manager C 563 in system C 535. The method of initializing the trace may vary in different circumstance, and different types of traces may be requested depending on the circumstances and the needs of the user 505. In an embodiment, the trace is started by the user 505 making a call to computer application A 510. In an embodiment, the call includes a URL for the application with the addition of parameters established for the performance trace.

Upon initiating the trace, trace data will be generated for each affected system, shown here as trace data A 570 for system A 520, trace data B 571 for system B 525, and trace data C 572 for system C 535. In an embodiment of the invention, the sets of trace data may utilize a common trace format (CPT—common performance trace), or may be converted to such a common trace format. In an embodiment of the invention, the trace engine 555 will combine the sets of trace data into a combined trace result 575. The combined trace result 575 then may be used to generate a trace report 580 for analysis by system user 505.

Figure 6:
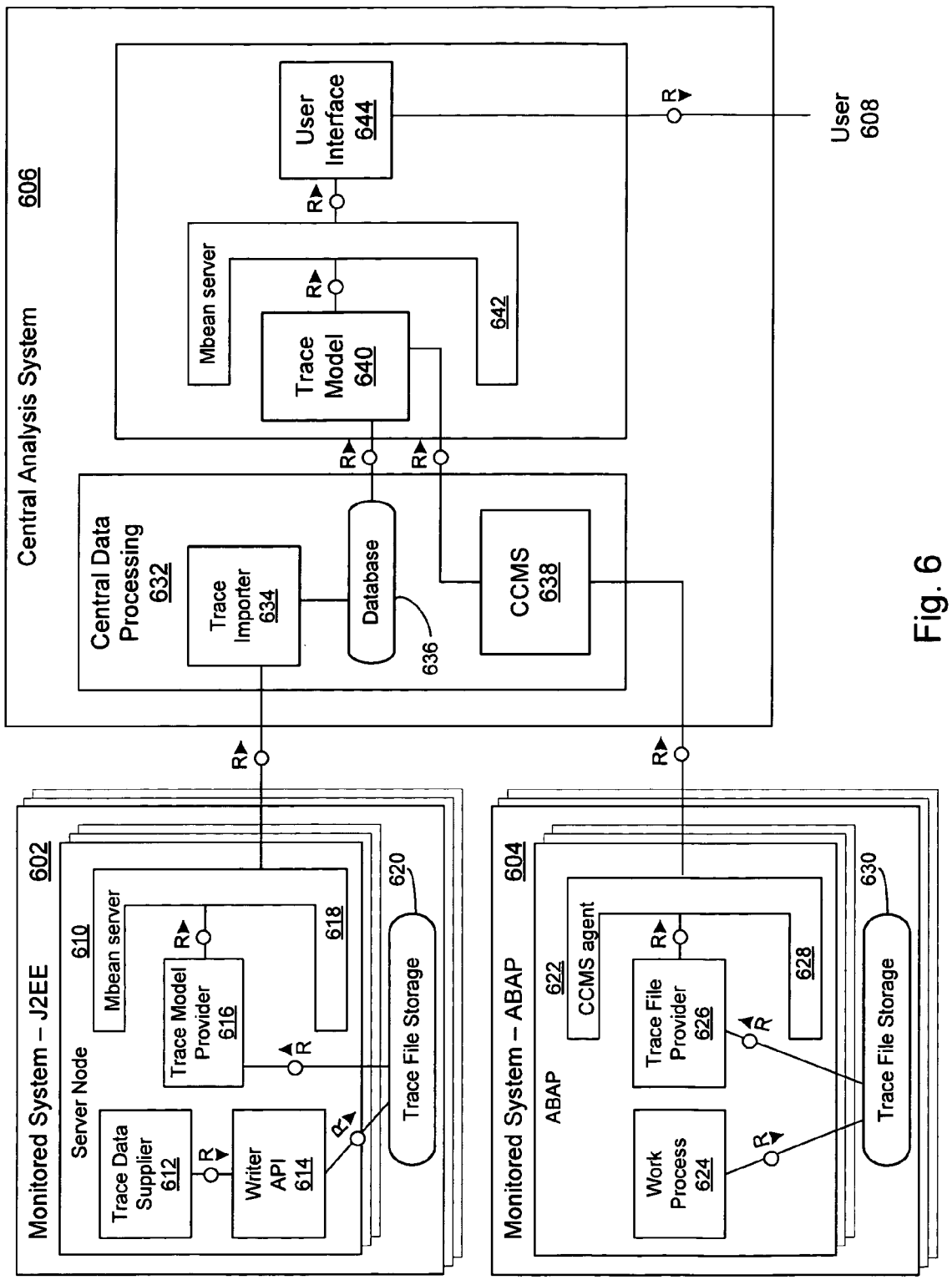
FIG. 6 is an illustration of components of an embodiment of the architecture of an end to end trace system.

FIG. 6 is an illustration of components of an embodiment of the architecture of an end to end trace system. FIG. 6 and the other figures herein are provide to illustrate embodiments of the invention, and do not contain all elements that may be present in a system or apparatus. In this illustrated example, a central analysis system 606 (which may be part of an administration system) will provide trace support for one or more J2EE monitored systems 602, each one of which may include one or more server nodes, and one or more ABAP monitored systems, each one of which may include an ABAP server. In an embodiment, in tracing a J2EE system utilizes instrumented code that creates a trace data supplier 612 to write performance trace data via an API 614 (application program interface), which may be an API utilizing a common trace format. In an embodiment, the performance trace data is written to a temporary storage, such as the trace file storage 620 for the J2EE monitored system 602. The system may further include a trace model provider, which may be implemented as an MBean registered to the local system MBean server 618 and which thus allows accessing the trace data from the central analysis system 606.

In an embodiment of the invention, an ABAP monitored system 622 includes a CCMS agent 628 that allows CCMS 638 to access trace data for the local ABAP system, which is collected by a work process 624 and storage in a temporary storage, shown as trace file storage 630. The use of CCMS functional modules allows retrieval of ABAP traces.

The central analysis system 606 includes a central data processing module 632 to retrieve trace data from the local systems, such as the J2EE monitored system and the ABAP monitored system. The central data processing system 632 may import mechanisms to obtain the trace data from the local systems, such as a trace importer module 634 to obtain trace data from J2EE systems, with the data then being stored in a database 636, and a CCMS system 638 to obtain trace data from ABAP systems. If traces are performed in other types of systems then the central analysis system 606 may include other types of import mechanisms. After being retrieved from a local server, such traces may be integrated into a central trace model 640 by retrieving the trace data from the database 636 and by performing RFC calls to CCMS system 638. The trace model 640 enables the end to end trace data, allowing for access to the trace data in a convenient manger for a user interface 644 via an MBean server 642, providing merged data from Java and ABAP sources, and providing for data filtering and aggregation of the data.

Figure 7:
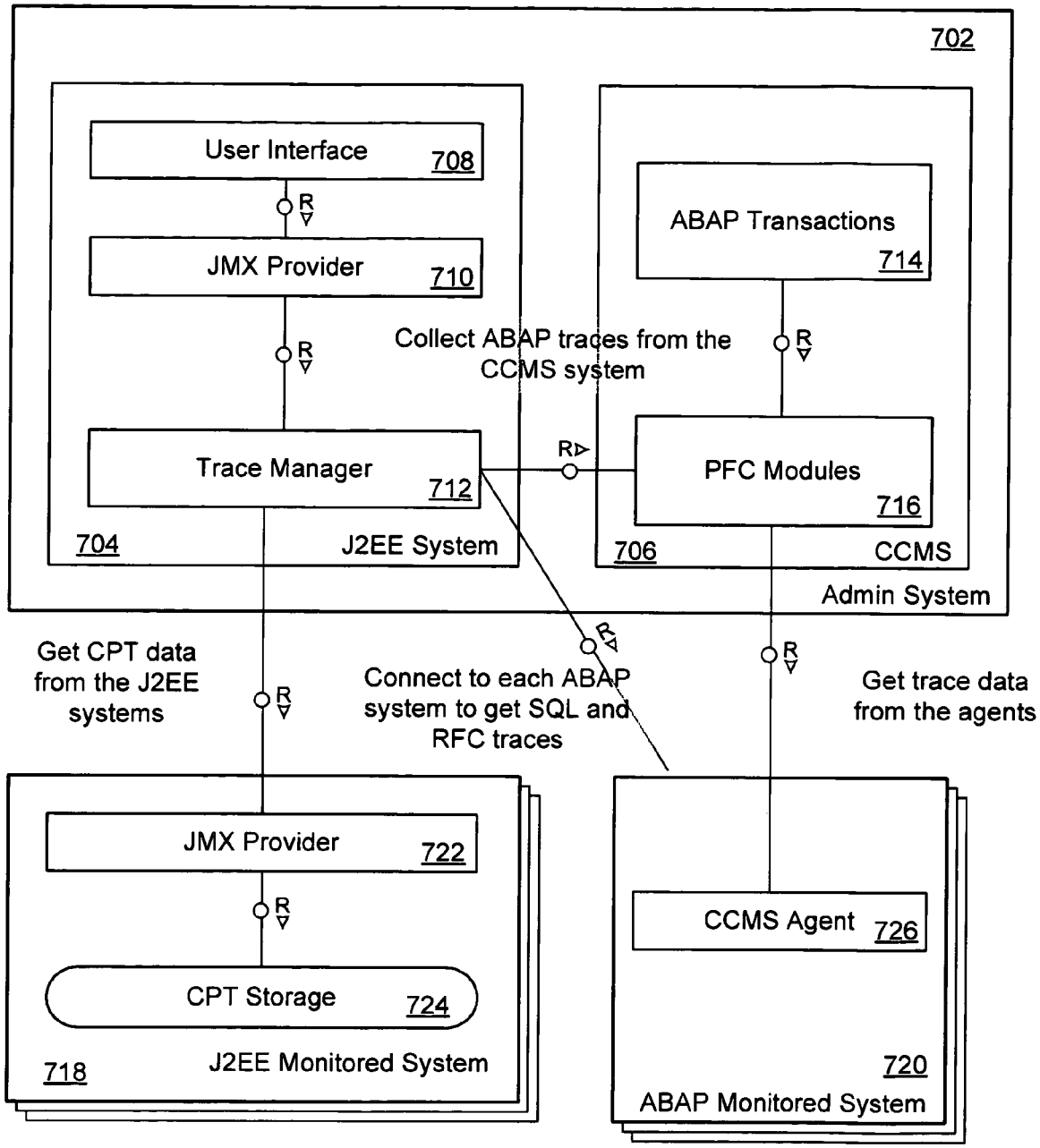
FIG. 7 illustrates an embodiment of a trace system.

FIG. 7 illustrates an embodiment of a trace system. In this illustration, an administration system 702 is responsible for implementing an end to end trace of a computer application, where the computer application includes components running on multiple systems. For example, in the implementation of a trace there may be one or more J2EE monitored systems 718 and one or more ABAP monitored systems 720. In an embodiment, the administration unit is a Web-based unit. The administration system 702 may include a J2EE system element and a CCMS element 706. Within the J2EE element 704 of the administration system 702 there may be a user interface 708, which may include, but is not limited to, a Web Dynpro application. The user interface 708 is coupled with a JMX provider, which may provide for messaging. The J2EE element 704 then includes a trace manager 712 to manage operations. The administration system 702 further includes a CCMS system, including a module for ABAP transactions 714 and PFC modules 716.

In an embodiment of the invention, the trace manager 712 is to generate one or more parameters for a trace session upon request from a user. In an embodiment, the parameters uniquely identify the trace system such that the trace session can be run without interference with other operations.

In the illustrated embodiment, the trace manager 712 of the administration system 702 is coupled with each J2EE monitored system 718 via a JMX provider 722 to obtain Java system trace data. The J2EE monitored systems each include a storage for trace data, which may include a common trace format data storage shown as the CPT storage 724. The administration system is further coupled with each ABAP monitored system 720 to obtain ABAP trace data. Each ABAP monitored system includes a CCMS agent 726, which provides for communication with the CCMS system 706 of the administration system 702. In an embodiment, the format of the ABAP system traces may vary and may require translation to a common trace format, such as CPT.

In an embodiment of the invention, the administration system is to initiate a trace on each affected J2EE monitored system 718 and ABAP monitored system 720. Each such system will trace the application operation, and collect the relevant trace data. The administration system 702 via the trace manager 712 will gather the trace data from each system, correlate the data together, and create a result reflecting an end to end trace of the application.

In an embodiment of the invention, the trace is started by calling a URL for the relevant computer application, together with the one or more parameters that have been generated by the trace manager for the trace session. In an embodiment of the invention, the trace will also be stopped by called the URL and the generated parameters.

Figure 8:
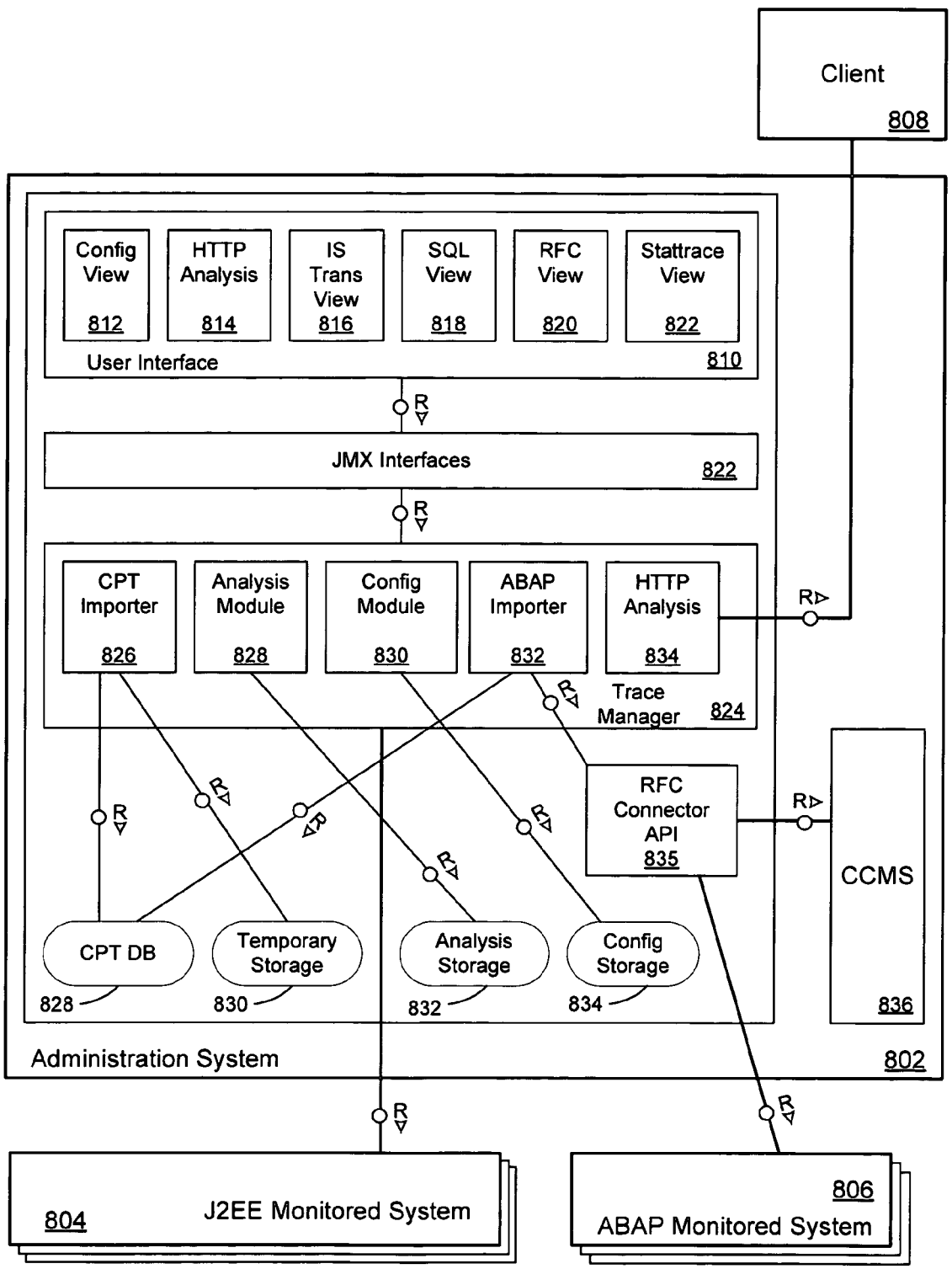
FIG. 8 is an illustration of an embodiment of an administration system that implements end to end traces.

FIG. 8 is an illustration of an embodiment of an administration system that implements end to end traces. The illustrated trace system provides details for an embodiment of system that may include the elements illustrated in FIG. 7. As illustrated, an administration system 802 is responsible for trace operations for a client 808 operating an application on one or more J2EE monitored systems 804 and one or more ABAP monitored systems 806. The J2EE monitored systems are coupled with a trace manager 824, and the ABAP monitored systems 806 are coupled to a CCMS system 836 via an RFC connector API 835. The API 835 is a proxy of the RFC function modules and creates a general framework for connection to the ABAP systems. The API connects to the CCMS system on administration system and to all ABAP monitored systems.

In this illustration, the trace manager 824 includes a number of modules for trace operations. The trace manager may include a configuration module 830, which contains methods for starting and stopping trace activities, and that maintains general information about the trace activities (such as name, start and end data, and filters) in a configuration storage 834. The modules may include an ABAP importer 832 to import the ABAP trace data via the RFC connector API 835 to a database 828, which may be a CPT (common performance trace) database. In addition, the trace data from the J2EE monitored systems 804 is stored in a temporary storage 830. The trace manager further includes a CPT importer 826, which obtains the trace data from the J2EE monitored systems 804 stored in the temporary storage, and imports the data to the database 828.

In one embodiment, the trace manager 824 may include a HTTP analysis module. If an HTTP proxy is used on the client side 808, then several XML files will be generated. These files are uploaded to the administration system 802, and, with the help of a responses.trc file that is generated by the HTTP service, the HTTP analysis is generated and imported to the database 828.

After the trace is stopped, the trace data is collected from the monitored system and imported to the database 828. In an embodiment, this data may then be analyzed by the analysis module and may be stored in a separate analysis storage 832.

Also illustrated are the JMX interfaces 822 to provide the link between the trace manager 824 and a user interface 810, which may include a Web Dynpro application. Contained within the user interface may be multiple views for the user to perform traces and analyze results, including a configuration view 812, an HTTP analysis view 814, an IS (Introscope) transactions view 816 a SQL view 818, an RFC view 820, and a Stattrace view 822.

Figure 9:
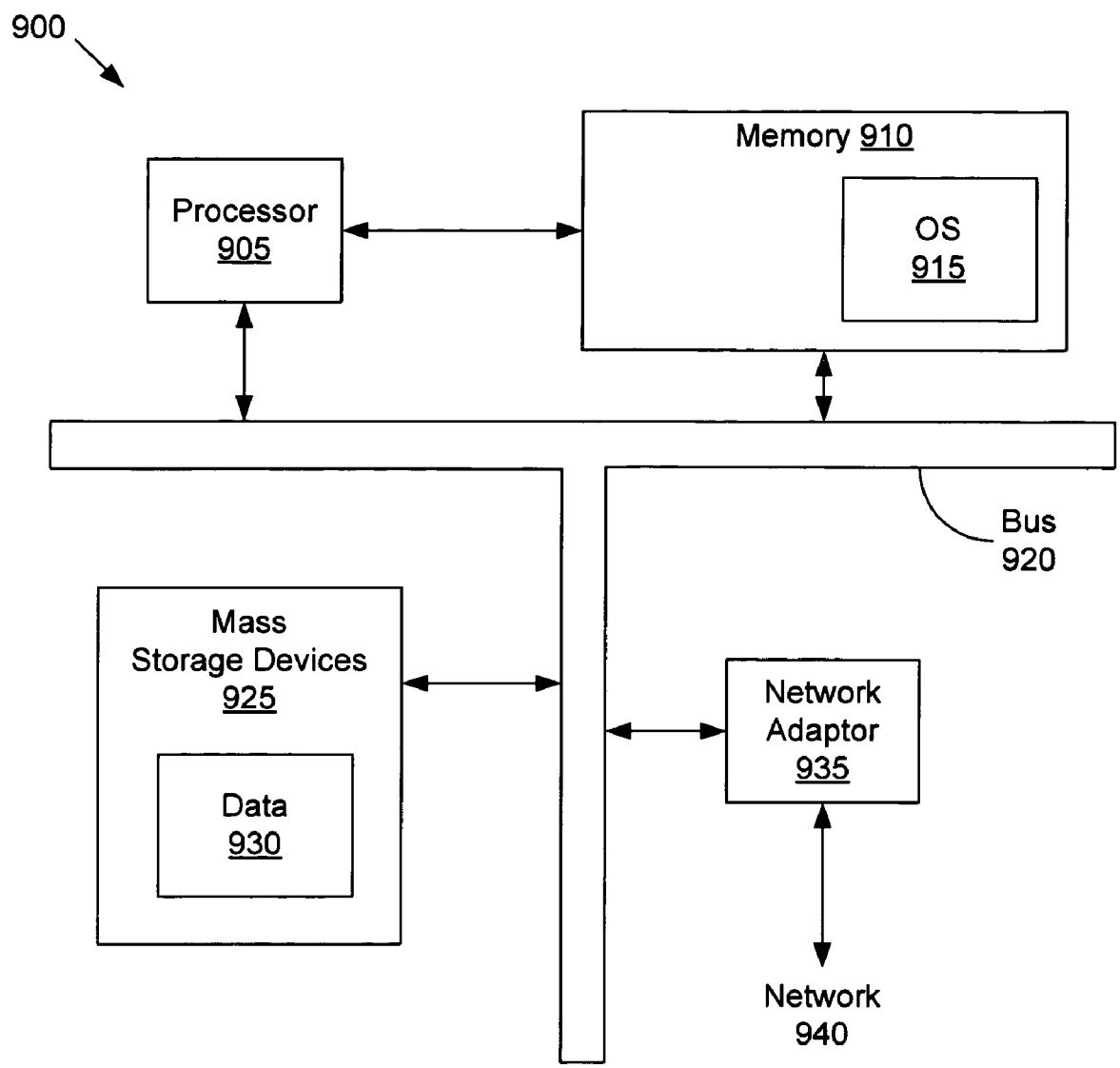
FIG. 9 is an illustration of a computer system that may be utilized in an embodiment of the invention.

FIG. 9 is an illustration of a computer system that may be utilized in an embodiment of the invention. FIG. 9 may represent a system on which an application is run, or another portion of a server system. As illustrated, a computing system 900 can execute program code stored by an article of manufacture. The computing system illustrated in FIG. 9 is only one of various possible computing system architectures, and is a simplified illustration that does include many well-known elements. A computer system 900 includes one or more processors 905 and memory 910 coupled to a bus system 920. The bus system 920 is an abstraction that represents any one or more separate physical buses, point-to-point connections, or both connected by appropriate bridges, adapters, or controllers. The bus system 920 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 9, the processors 905 are central processing units (CPUs) of the computer system 900 and control the overall operation of the computer system 900. The processors 905 execute software stored in memory 910. A processor 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 910 is or includes the main memory of the computer system 900. Memory 910 represents any form of random access memory (RAM), read-only memory (ROM), flash memory, or the like, or a combination of such devices. Memory 910 stores, among other things, the operating system 915 of the computer system 900.

Also connected to the processors 905 through the bus system 920 are one or more internal mass storage devices 925 and a network adapter 935. Internal mass storage devices 925 may be or may include any conventional medium for storing large volumes of instructions and data 930 in a non-volatile manner, such as one or more magnetic or optical based disks. The network adapter 935 provides the computer system 900 with the ability to communicate with remote devices, over a network 950 and may be, for example, an Ethernet adapter.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   establishing a server session for a computer application, the computer application operating on a computer system;
   establishing a trace session that is correlated to the server session on the computer system;
   enabling a performance trace of the computer application under the trace session to collect trace data for the performance trace while maintaining correlation between the trace data and the trace session by including a correlator in a trace enablement call to the computer application; and
   collecting the correlated trace data for the performance trace.

2. The method of claim 1, wherein the computer application is also running on a second computer system;
   and wherein enabling the performance trace of the computer application while maintaining correlation between the trace data and the trace session comprises including the correlator in a second trace enablement call to the computer application operating on the second computer system; and
   further wherein collecting the correlated trace data for the performance trace comprises collecting a second set of trace data for the performance trace, the second set of trace data being correlated with the set of trace data based on the correlator.

3. A performance trace system comprising:
   an administration unit, the administration unit including a trace engine to manage performance trace of computer applications; and
   a computer landscape coupled with the administration unit, the computer landscape including a computer system;
   wherein the administration unit is to enable a performance trace of a computer application running on the computer system in a session with a user, the administration unit to generate a trace manager on the computer system for the performance trace; and
   wherein the trace manager collects a set of trace data for the performance trace, the set of trace data being correlated with the session.

4. The performance trace system of claim 3, wherein the trace data is correlated with the session by limiting collection of trace data to the trace session.

5. The performance trace system of claim 4, wherein a second session is established on the computer system, and wherein the enablement of the performance trace does not enable the collection of trace data for the second session.

6. The performance trace system of claim 3, wherein the trace data is correlated by attaching an identification to the set of trace data.

7. The performance trace system of claim 6, wherein a second session is established on the computer system, and wherein the enablement of the performance trace enables the collection of trace data for all operations on the computer system.

8. The performance trace system of claim 3, wherein the computer landscape includes a second computer system, and wherein a second set of trace data collected for a performance trace of the computer program on the second computer system is correlated with the set of trace data.

9. A computer-readable medium having tangibly stored thereon instructions for a performance trace of a computer application, the instructions which when executed by a computer perform operations, the operations including:
   establishing a server session for the computer application, the computer application operating in one or more computer systems;
   establishing a trace session that is correlated to the server session;
   enabling a performance trace of the computer application under the trace session to collect trace data for the performance trace while maintaining correlation between the trace data and the trace session by including a correlator in a first trace enablement call to the computer application; and
   collecting the correlated trace data for the performance trace.

10. The medium of claim 9, wherein the computer application is also running on a second computer system of the one or more computer systems and wherein enabling the performance trace of the computer application while maintaining correlation between the trace data and the trace session comprises including the correlator in a second trace enablement call to the second computer system; and
  further wherein collecting the correlated trace data for the performance trace comprises collecting a second set of trace data for the performance trace, the second set of trace data being correlated with the set of trace data based on the correlator.

11. The medium of claim 10, wherein collecting includes combining the set of trace data with the second set of trace data based on the correlator.

12. The medium of claim 9, wherein the correlator is a distributed statistics record passport created on at least one of the one or more computer systems and distributed with the trace enablement call to save a correlation identification with the collected trace data.

13. The medium of claim 9, wherein the correlator comprises at least one of a passport identification, a user name, and a transaction name.

14. The method of claim 1, wherein the correlator is a distributed statistics record passport created on the computer system and distributed with the trace enablement call to save a correlation identification with the collected trace data.

15. The method of claim 1, wherein the correlator comprises at least one of a passport identification, a user name, and a transaction name.

16. The method of claim 2, wherein collecting includes combining the set of trace data with the second set of trace data based on the correlator.

* * * * *

UNITED STATES PATENT AND TRADEMARK OFFICE
CERTIFICATE OF CORRECTION

| | | |
|---|---|---|
| PATENT NO. | : 7,640,459 B2 | Page 1 of 1 |
| APPLICATION NO. | : 11/540851 | |
| DATED | : December 29, 2009 | |
| INVENTOR(S) | : Ivanov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 415 days.

Signed and Sealed this

Twenty-first Day of December, 2010

David J. Kappos
*Director of the United States Patent and Trademark Office*